Figure 1:
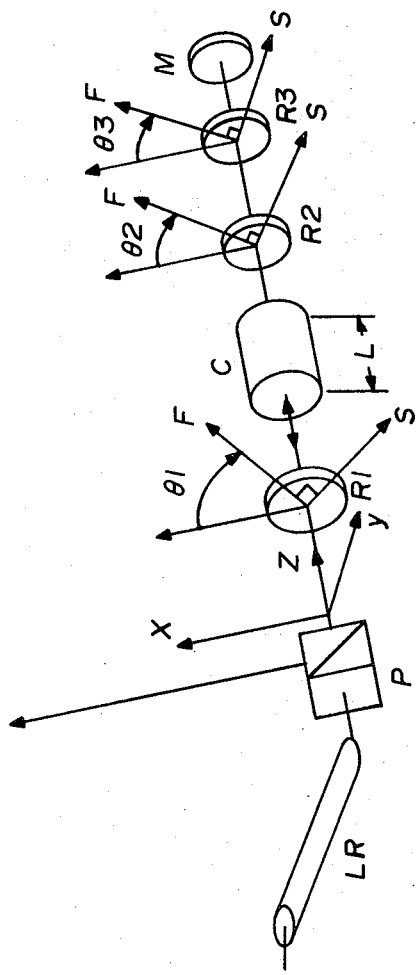
Figure 1A:
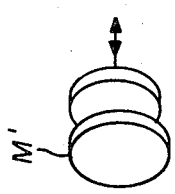
Figure 1B:
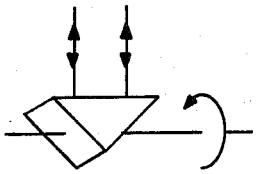

United States Patent [19]

Dahlstrom

[11] 3,813,611

[45] May 28, 1974

[54] METHOD AND DEVICE FOR THE REALIZATION OF A NON-LINEAR RELEASE OF ENERGY IN HIGH POWER LASERS

[76] Inventor: Lars Erik Dahlstrom, Royal Institute of Technology, 100 44 Stockholm, Sweden

[22] Filed: Nov. 3, 1972

[21] Appl. No.: 303,346

[30] Foreign Application Priority Data
Nov. 5, 1971  Sweden.............................. 14132/71

[52] U.S. Cl. .......................................... 331/94.5 Q
[51] Int. Cl............................................. H01s 3/11
[58] Field of Search..................... 331/94.5; 350/157

[56] References Cited
UNITED STATES PATENTS
3,407,364  10/1968  Turner................................ 331/94.5
3,521,069  7/1970  DeMaria et al.................... 331/94.5

*Primary Examiner*—William L. Sikes

[57] ABSTRACT

Several embodiments of a device for the non-linear release of energy from a laser cavity of the high power type is described. In each a laser is connected to a release unit which includes a Glan prism, a Kerr-active medium and several retardation elements arranged to achieve the intended purpose.

8 Claims, 17 Drawing Figures

METHOD AND DEVICE FOR THE REALIZATION OF A NON-LINEAR RELEASE OF ENERGY IN HIGH POWER LASERS

SUMMARY OF THE INVENTION

The present invention concerns a method and a device for executing the method so as to realize a non-linear release of energy from a laser cavity of the high power type with a release unit which comprises a Glan prism or a device with a similar function.

In a mode-locked high power lasers, dielectric mirrors are used in the laser cavities to achieve release. A considerable problem arises due to the fact that these mirrors are destroyed after a few laser shots. This is true in particular of dielectric mirrors with high reflectivity which consist of a large number of dielectric layers. Attempts have been made to produce new resonator configurations in which the mirrors are replaced by prisms. Certain difficulties arise, however, in such devices when the energy is to be released in a practical manner from the resonator.

It is the object of the present invention to provide a method to facilitate a non-linear release of energy, whereby a release unit is used which comprises a Glan prism. The method is characterized essentially by the fact that the light which passes back and forth in the laser cavity is made to pass through the release unit as well, which comprises a number of retardation elements and a cell which contains a Kerr-active medium in which unit the retardation element has been provided with such a design and orientation in relation to the Glan prism, and in which the cell has been made of such a length, and in which a Kerr-active medium of such a type has been chosen that the reflected laser-light—before it enters into the Glan prism—becomes polarized in such a way as to produce a degree of release which is a non-linear function of the intensity of the laser light, whereby at a low intensity, the light is linearly polarized and the degree of release is practically equal to zero, and whereby at a high intensity, the light is eliptically polarized, and the degree of release is high and practically the entire energy of the laser is released.

Figure 1C:
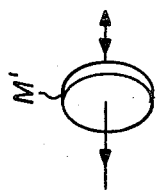
Figure 2A:
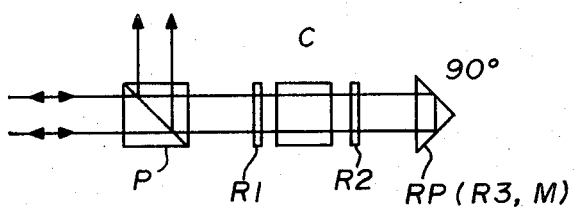
Figure 2B:
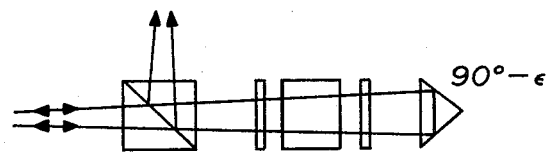
Figure 2C:
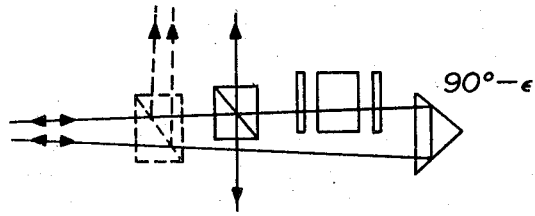
Figure 2D:
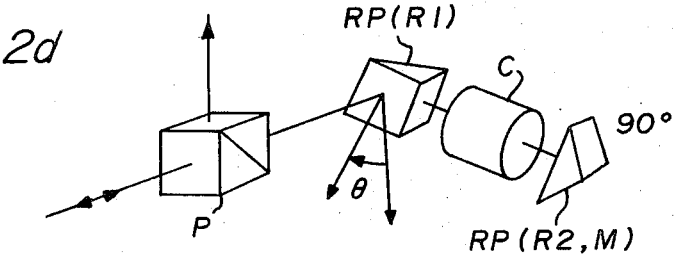
Figure 3A:
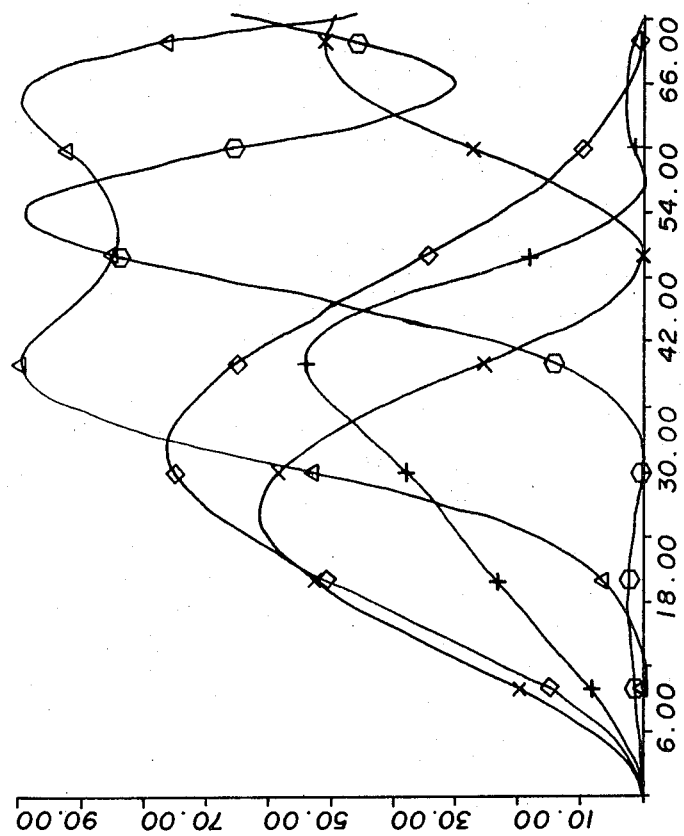
Figure 3B:
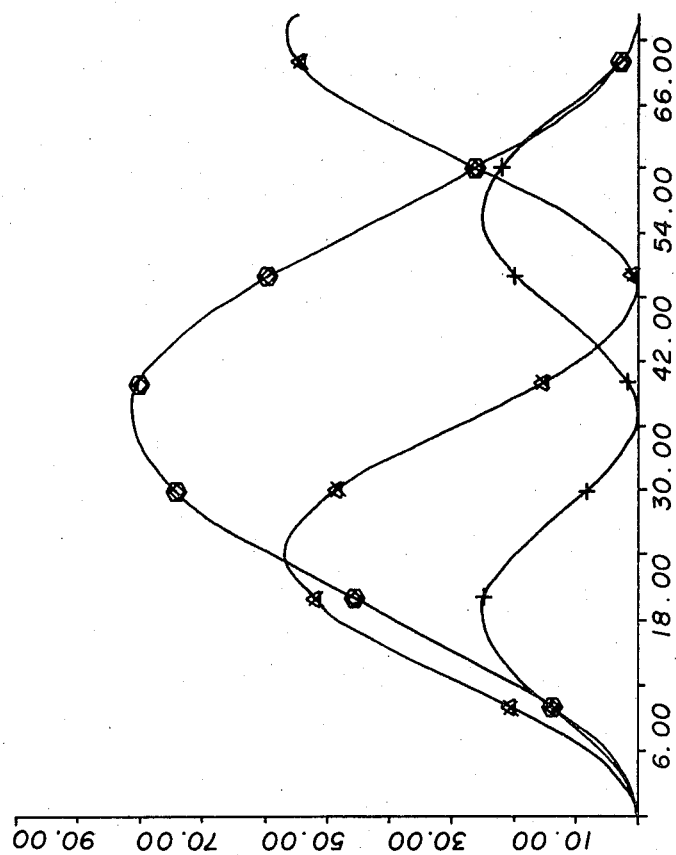
Figure 3C:
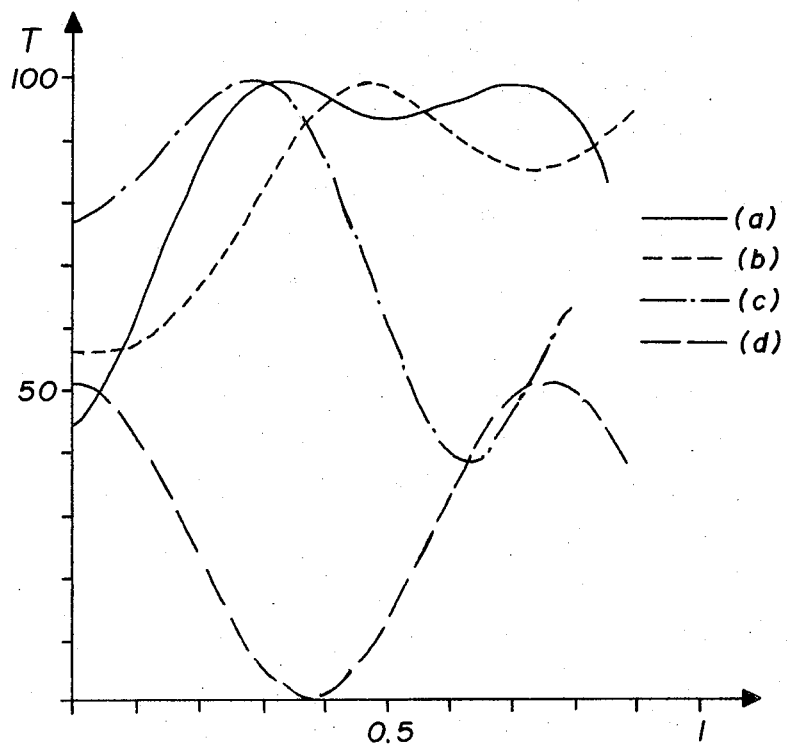
Figure 4:
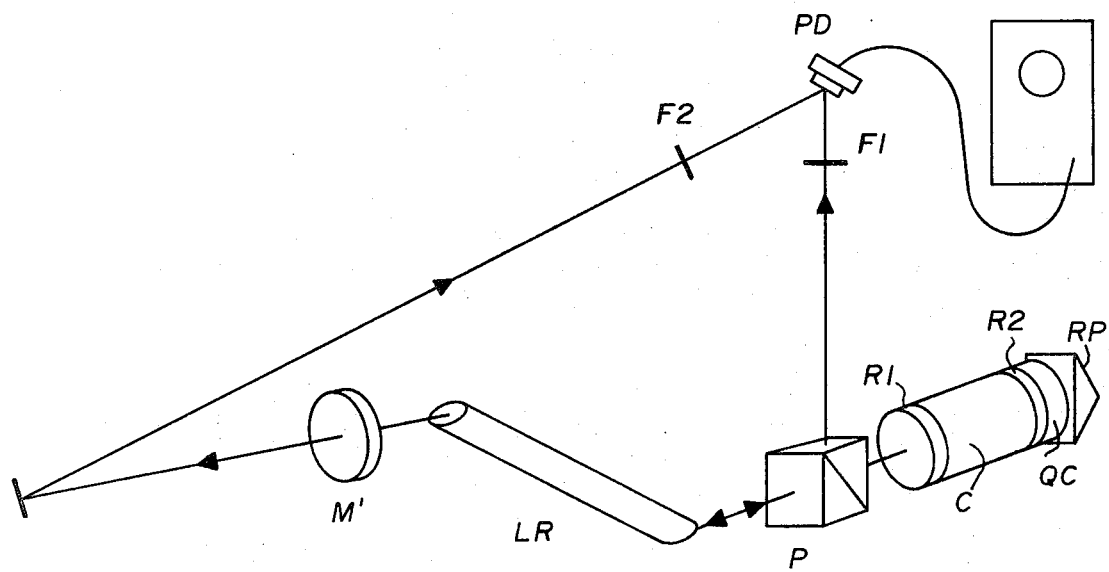
Figure 5A:
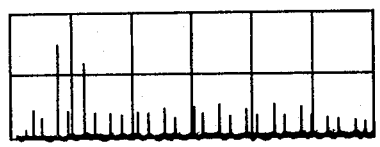
Figure 5B:
Figure 5C:
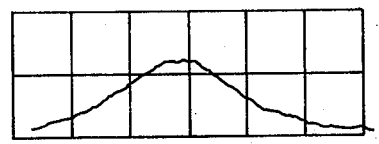
Figure 5D:
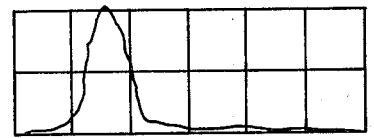
Figure 5E:
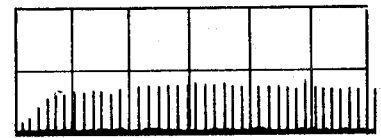

The invention will be described in greater detail in connection with the attached drawings wherein FIGS. 1–1c show a schematic view of a laser which is equipped with a release unit according to the invention, FIGS. 2a–2d show some practical examples of embodiment of release units, FIGS. 3a–3c show theoretically calculated curves for the transmission as a function of the intensity, FIG. 4 shows a measuring device which is used, and FIGS. 5a–5e show oscilloscope pulses measured at two different points in the measuring equipment.

The principle of the release unit is that the polarization ellipse of an elliptically polarized light wave is rotated around the direction of propagation when it passes through a medium with a refractive index which is a function of the intensity (the optical Kerr effect). The effect is substantial only at intensities I on the order of magnitude of $10^7 - 10^9$ W/cm$^2$ and then only in certain media, where the optical Kerr effect is great, such as in liquids consisting of anisotropic molecules P-3. The Glan prism P and retardation elements are selected so that light with low intensity (that is, when the effect of the Kerr-active medium can be neglected) is linearly polarized parallel to the Glan prism P following $R_1$ (in front of P). When the intensity is higher, the light is generally elliptically polarized following $R_1$ (in front of P). In this case, a release of the energy from the cavity is obtained.

The transmission of the release unit, which is a function of the intensity, can be selected by means of the selection of the retardation element and its orientation and by the selection of the Kerr-active medium and the cell length.

FIG. 2a shows a practical solution. In this case, $\Phi_1 = -\Phi_2 = \alpha$ that is, $R_1$ and $R_2$ have the same relative phase but they are oriented so that the S axis of the retardation element $R_1$ is parallel to the F axis of the retardation element $R_2$. In this case, $\Phi_3$ is the phase shift that is obtained in the prism in the case of total reflection. The 90° (possibly 90° $-\epsilon$) edge of the prism is parallel to or normal to the direction of polarization of the Glan prism. In FIG. 2b, the 90° prism has been replaced by a prism with a top angle 90° $-\epsilon$. In the latter case, the light enters in a loop. In this case, it is possible to allow the light to pass only once per turn, through the cell, as shown in FIG. 2c. There are two differences in principle between the cavity with 90° prisms and that with 90° $-\epsilon$ prisms, namely a) the basic mode TEM$_{oo}$ can be obtained wih the latter but not with the former because of the assymetry at the prism edge, and b) in the first embodiment of the cavity, the light travels there and back, while in the latter case, the light travels in a loop and in that case, two separate beams which correspond to the two opposite directions in the loop are obtained. FIG. 2d shows a release unit which consists of two prisms where $\Phi_1 = -\Phi_2 = \alpha$ and $\Phi_3 = 0$. This is the optimum embodiment with regard to the number of components.

We will now analyze the system which is shown in FIG. 1 where $\Phi_1 = -\Phi_2 = \alpha$ and $\Phi_3 = \beta$. This is almost identical with that which has been described in connection with FIG. 2a. What has been added in this case is an additional retardation element, the axes of which are parallel to those of the prism. By means of this modification, we now have the possibility of varying $\Phi'_3 = \beta$, since for the prism is determined, at a given angle of incidence, by its refractive index. This is certainly a special case of the general one in accordance with FIG. 1, but it is a solution suitable for practical use, since in this case, the alignment of the components, that is, the condition for obtaining linearly polarized light following $R_1$ (in front of P) is independent of the wavelength of the alignment light.

Since the mode-locked laser has a relatively large band width, we assume that the retardation elements are made in such a way that their relative phases are approximately the same throughout the spectral range of the laser, which is true in the case of passage through a retardation plate of the first order or in the case of total reflection (glass-air).

The transfer matrix T for the system is obtained by multiplication of the matrix $R(\Phi)$ for the retardation element, $N(-\delta/2)$ for the rotation of the polarization ellipse in the cell C, M ($\theta$) for the rotation of the system of coordinates through the angle $\theta$ around the z axis, and D for the reflection in the mirror M.

We obtain the following expression:

$$T_{tot} = T(-\theta, -\alpha, \delta_2) R(\beta) D R(\beta) T(\theta, \alpha, \delta_1) \qquad (1)$$

where
$$T(\theta, \alpha, \delta) = M(\theta)R(-\alpha)N(-\delta/2)R(\alpha)M(-\theta) \quad (2)$$

$T(\theta, \alpha, \delta)$ is the transfer matrix (in a system of coordinates where the x axis is parallel to the direction of polarization of the Glan prism) for a passage through $R(\alpha)$, the cell C, and $R(-\alpha)$. A passage through the cell gives rise to a rotation of the polarization ellipse through $\delta/2$ radians around the z axis (the direction of the rotation is determined by the direction in which the polarization ellipse is traversed). This is described by the matrix $N(-\delta/2)$ and $$D = \begin{bmatrix} 1 & 0 \\ 0 & -1 \end{bmatrix} \quad (3)$$

D is the matrix for a reflection in the mirror M.

If the intensity inside the laser cavity is $I(t)$, the intensity released from the cavity will be the following:
$$I_{ut}(t) = (T_{tot})_{21}{}^2 \cdot I(t) \quad (4)$$

For a given release unit, $\alpha$ and $\beta$ are constants. The sign of the constant can be changed by a 90° rotation. $\theta$ can be varied continuously, but it is constant during the lasering, and it is possible to write the following for this:

$$T_{tot} = T_{tot}(\delta_1, \delta_2) = T_{tot}(I(t)) \quad (5)$$

since $\delta_1$ and $\delta_2$ are functions of $E^2$, that is $I(t)$, it follows that:

$$\delta_k = (3wc/rc)\chi_3{}^{1221}[\omega](E_+{}^2 - E_-{}^2)_k; k = 1, 2 \quad (6)$$

$(E_+{}^2 - E_-{}^2)_k$ is obtained from $$(\overline{E}_+ - \overline{E}_-)_k = [i_a{}^a] + [i_b{}^b] = T_k[E_o] = \begin{bmatrix} (T_k)_{11}E_o \\ (T_k)_{21}E_o \end{bmatrix} \quad (7)$$

The transfer Matrix $T_k$ for calculation of the state of polarization at the start of each passage through C is obtained from the following:
$$T_1 = R(\alpha)M(-\theta) \quad (8)$$
and
$$T_2 = R(-\alpha)M(\theta)R(\beta)DR(\beta)T(\theta, \alpha, \delta_1) \quad (9)$$
respectively.

Equation (7) yields the following:
$$(E_+{}^2 - E_-{}^2)_k = 2(T_k)_{11} \cdot (T_k)_{21} \cdot E_o \sin\gamma_k \quad (10)$$
where
$$\gamma_k = (T_k)_{27} - (T_k)_{11} \quad (11)$$

Equation (6) can also be written
$$\delta_k(I) = (12**I/M^2\epsilon_o C^2)\chi_3{}^{1221}[\omega] \cdot h_k(I) \quad (12)$$
where
$$h_k(I) = I \cdot (T_k)_{11} \cdot (T_k)_{21} \sin\gamma_k(t) \quad (13)$$

Equations (6,12) apply only when the relaxation time of the Keer-active medium $T<<T_p$, where $T_p$ is the pulse width of the laser pulse. Since the finite value of the relaxation time has to be taken into consideration, the following modification has to be applied to equation (12)

$$h_k(I) = h_k(I(t)) \rightarrow \frac{1}{\tau}\int_{-\infty}^{\tau} h_k(I(t'))\exp\left(\frac{t'-\tau}{\tau}\right)dt' \quad (14)$$

FIG. 3 shows calculated (plotted) curves which give the transmission $(T_{tot})_{21}{}^2$, the degree of release, as a function of the intensity for $\alpha = 60°$ and $= \frac{1}{2}\eta = 38°$. FIG. 3a shows curves for a double passage and FIG. 3b for a single passage. In this case, the finite relaxation time T of the medium has not been taken into consideration, since this presumes that certain assumptions have been made with regard to the shape of the curve for $I(t)$. FIG. 3 shows that the transmission properties of the release device can be altered appreciably by merely varying $\theta$. By suitable choice of the components and of the $\theta$ value, a transmission function can be obtained for which the changeover from a low to a high transmission takes place within a relatively narrow interval (see FIG. 3a for $\theta = 15°$ and 25°).

Since the losses in the laser cavity are small at low intensity (owing to the release being low), the amplification becomes great in the laser, which means that the increase in the intensity per double passage in the laser resonator becomes high. If the increase is so great that the intensity after a number of passages produces only a relatively low release, but after a further double passage increases so that a high release is obtained, only one pulse is obtained as opposed to a pulse train in the usual case.

In the case in which the relaxation time is on the same order of magnitude as the pulse width $T_p, \delta(t)$ and $h(t)$ do not have the same time behavior over time. $\delta(t)$ has approximately the same curve shape as $h(t)$, but is somewhat skewed as a function of T. This means that the degree of release assumes its maximum value when the intensity $I(t)$ of the cavity diminishes. The front edge of $I(t)$ serves in this case as the opening pulse for its rear edge.

The Kerr-active medium alters the spectrum of the laser since, due to the non-linearity of the medium, coupling is obtained between the different oscillation modes (longitudinal and transverse) of the laser. The mode-locking of the laser will thus be brought into action. We have assumed in this case that the mode-locking takes place in a different manner, e.g., with the aid of bleachable dyestuff. The Mode-locking with the aid of the Kerr-active medium has been theoretically analyzed earlier and verified experimentally in a ruby laser. In this case, it is necessary to a laser of a certain arrangement in order to obtain high intensity pulses.

It has been shown earlier that the speed at which the exchange of energy (due to the influence of the Kerr-active medium) takes place between the modes of the resonator at a given density of energy is proportional to $ex_3/T$. It can also be shown that the condition for a good response [that is $\delta(t)$ $h(t)$] is $T<<T_p$. The condition for insuring that the Kerr-active medium intensifies the mode-locking and the condition for achieving a large $\delta$ at a given intensity coincide in this case. It is also true that the coupling between the $k^{th}$ and the $(k + p)^{th}$ modes is greatest when $p = 1/\Omega T$, where is the angular frequency of the basic mode (longitudinal) of the resonator.

Since $\Omega/2\pi$ is the lowest frequency component which can occur, T must be $<<1/\Omega$. This provides an upper limit for T. On the other hand, $T < 1/\Delta\nu$, where $\Delta\nu$ is the line width of the laser medium, the energy will be released outside the amplification curve of the laser medium. When mode-locking is complete, $T_p \approx 1/\Delta\nu$.

This is generally not achieved since mode-locking is not obtained over the whole line width of the laser due to the non-linearities.

To prevent self-focusing, the length of cell must either be short or the cell has to be divided up into several cells so that the laser beam is defocussed.

FIG. 4 shows a measuring set-up which is used to verify the curves in accordance with FIG. 3a and FIG. 3b. The release unit comprises a Glan prism P which is connected to the laser rod LR. It also comprises two double crystal retardation plates $R_1$ and $R_2$, where $\alpha = 60°$, placed on either side of the Kerr-active cell C. The release unit includes a 90° prism with $\beta = 38°$. The retardation plates also serve as cell windows. The plate nearest the prism and the front of the prism constitutes a Q-pulsing cell. A mirror $M_1$ is connected to the other end of the laser unit. Transmission through this made it possible to measure the energy inside the laser cavity. Also included are two filters $F_1$ and $F_2$, a photo-detector PD, and an oscilloscope. Mode-locking and Q-pulsing were obtained simultaneously by means of a special solution in the cell. $CS_2$ or nitrobenzene is used as a Kerr-active medium in the cell C. In order to allow experimental verification of the theoretical curves in FIG. 3, both the energy in the cavity and the length of cell are varied. The variation in the energy in the cavity is achieved by changing the concentration of the dyestuff. FIG. 5 shows the two pulse trains, the amplitude of which corresponds to the pulse energy from the dielectric mirror and from the output at the Glan prism respectively.

FIG. 3 and FIG. 5 show that it is possible for a given energy in the cavity to modify the released energy and the number of pulses by varying the value of $\theta$. FIG. 5a shows that, in a certain case, only some individual pulses can be obtained. Because the amplification in the laser unit that was used was too small, an individual pulse was not obtained, that is, essentially total release of the energy of the cavity in a single pulse. In the course of the variation of the cell length from 5 to 40 mm with constant energy in the cavity, the degree of release was increased at first, but at a certain length, a balance was obtained between the amplification and the degree of release. Calculation of the intensity from data in the release unit and the Kerr-active medium indicate that the order of magnitude of the intensity in the cavity was $10^8 W/cm^2$.

A new passive method has been described above both experimentally and theoretically for the release of energy from a mode-locked laser. The transmission or the degree of release of the device, which is a non-linear function of the intensity in the laser cavity, can be selected by means of a suitable choice of the components and by means of a suitable orientation of the same. It was also shown in the foregoing that, in certain cases, an appreciable reduction in the number of released pulses may occur. By means of the method described, it is also possible to obtain in a passive manner a separate picosecond pulse, that is, release of essentially the entire energy in the laser cavity in a single pulse.

I claim:

1. Apparatus, in combination with a laser which produces light pulses along a path for selectively releasing energy from said laser, said apparatus including:
   a mirror mounted in said path for reflecting said light pulses back along said path,
   light polarizing means mounted to intersect said path between said mirror and said laser to operate on said light pulses; and
   means having a refractive index which is a function of light intensity incident thereon, mounted to intersect said path between said mirror and said laser to operate on said light pulses so that the effect of said light polarizing means upon said light pulses will be a function of light intensity thereby enabling self-release of said light pulses if said light pulses achieve a predetermined intensity.

2. The apparatus as defined in claim 1 also including:

means for varying the Q of said laser as a function of time.

3. The apparatus as defined in claim 1 in which said light polarizing means include a Glan prism.

4. Apparatus in accordance with claim 3 in which the mirror is preceded by a retardation element, which together with the mirror comprises a device which is equivalent to one end reflector of the laser.

5. Device in accordance with claim 4, in which the mirror consists of a $(90 - \alpha)°$ prism, the $(90 - \alpha)°$ edge of which is parallel to the direction of polarization of the Glan prism.

6. Device in accordance with claim 4 in which the mirror consists of a $(90 - \alpha)°$ prism, the $(90 - \alpha)°$ edge of which forms a 90° angle with the direction of polarization of the Glan prism.

7. Apparatus in accordance with claim 3, in which the mirror consists of a 90° prism, the 90° edge of which is parallel to the direction of polarization of the Glan prism.

8. Apparatus in accordance with claim 3, in which the mirror consists of a 90° prism, the 90° edge of which forms a 90° angle with the direction of polarization of the Glan prism.

* * * * *